May 18, 1926.
J. R. SENSIBAR
1,585,268
APPARATUS FOR UNLOADING BOATS
Filed Dec. 22, 1924   3 Sheets-Sheet 1
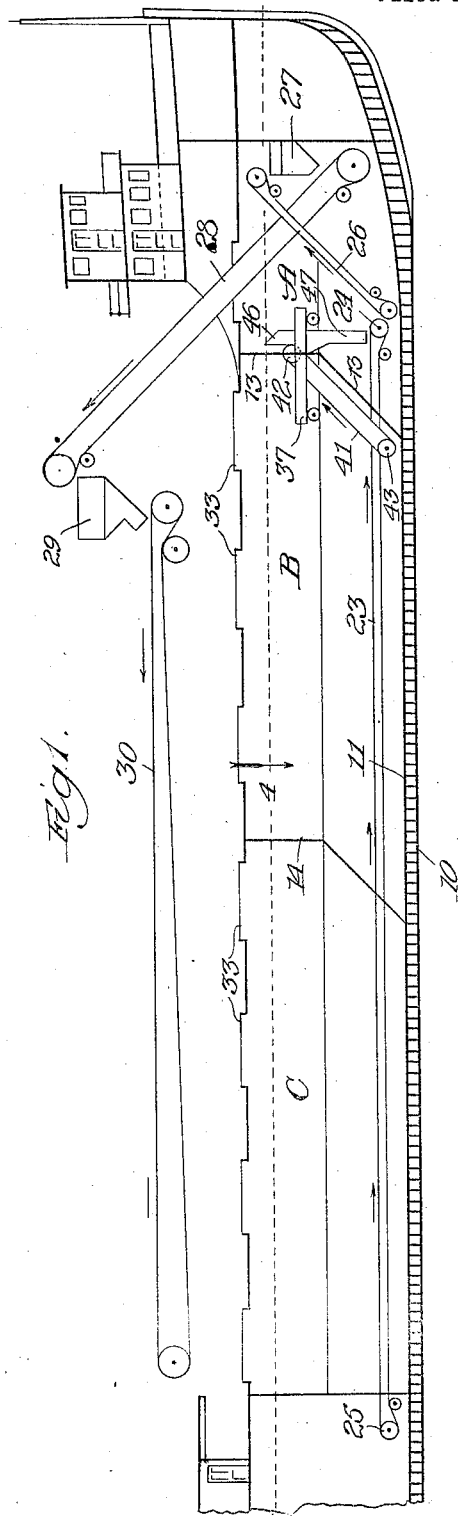
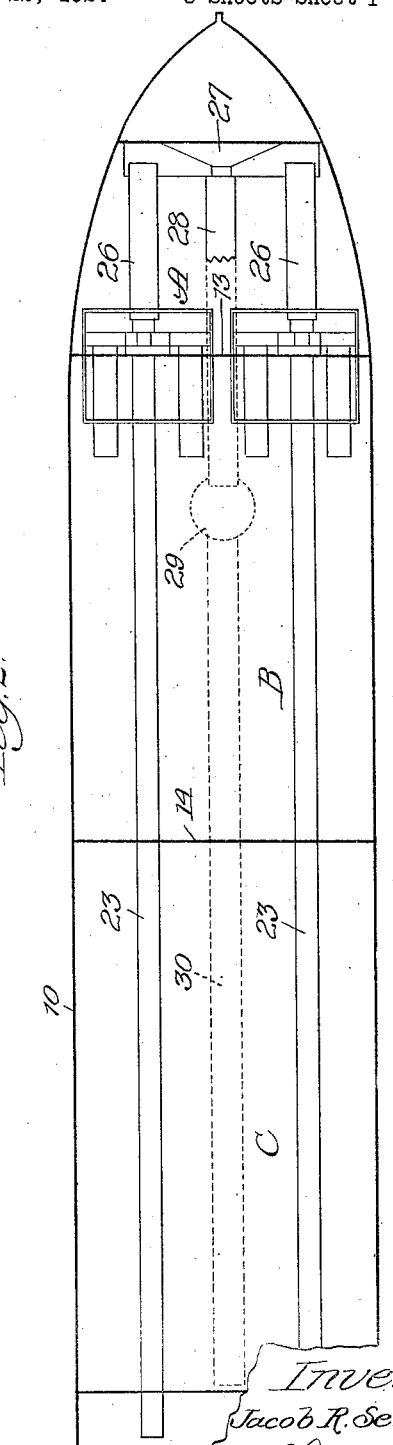
Inventor,
Jacob R. Sensibar,
By Dyrenforth, Lee, Chritton and Wiles,
Attys.

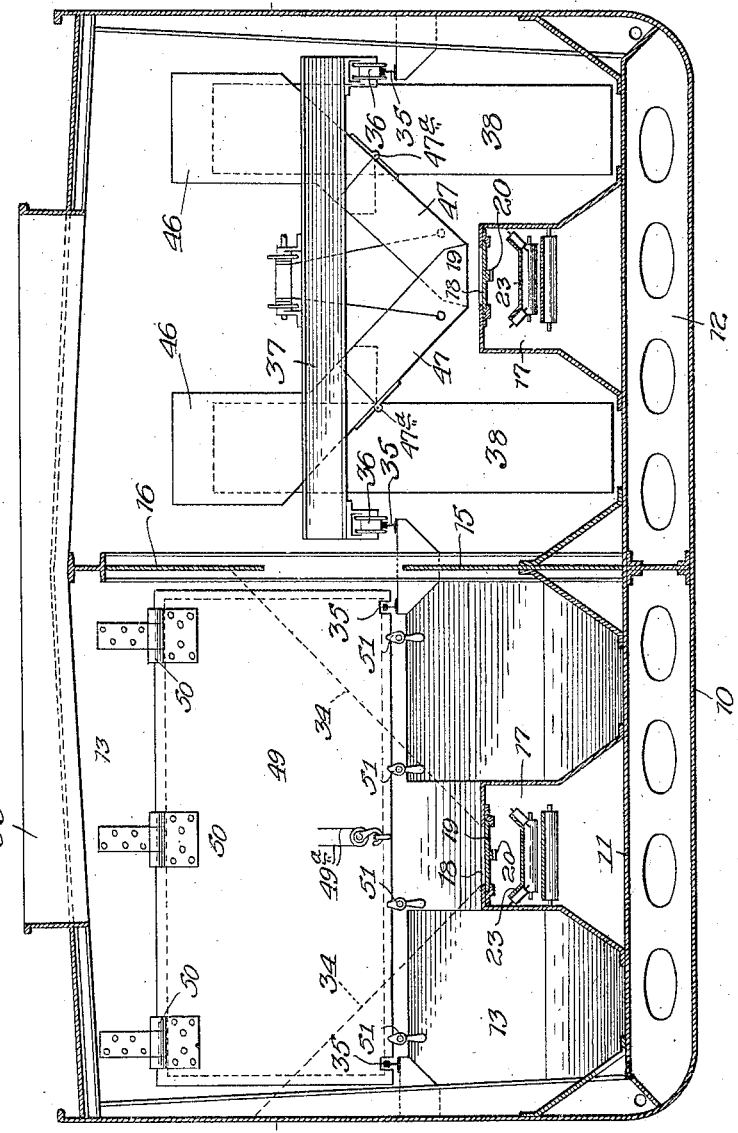

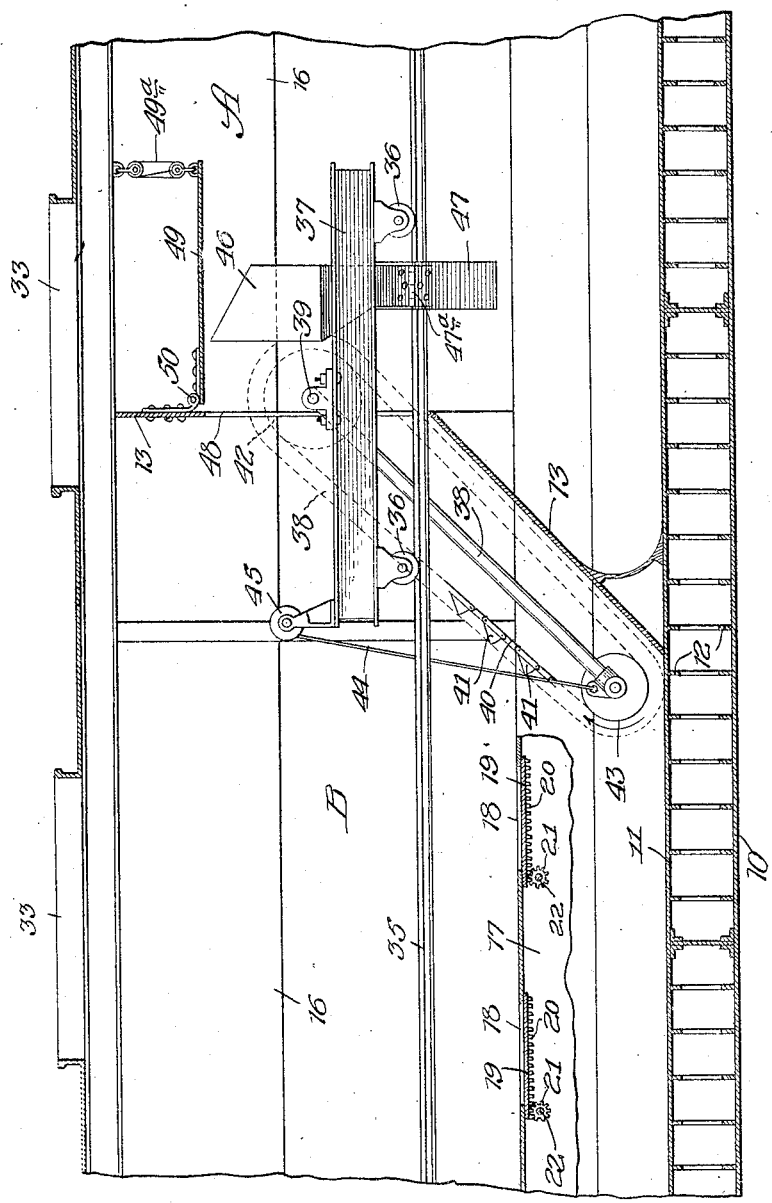

Patented May 18, 1926.

1,585,268

UNITED STATES PATENT OFFICE.

JACOB R. SENSIBAR, OF CHICAGO, ILLINOIS.

APPARATUS FOR UNLOADING BOATS.

Application filed December 22, 1924. Serial No. 757,469.

This invention relates to method of and apparatus for unloading boats. The primary object of the invention is to provide a method of and means for quickly and efficiently removing loose materials as coal, sand, grain and the like from the holds of boats or similar compartments wherever located.

Another object is the provision of increased hold capacity for boats of a given size.

These and other objects are accomplished by this invention which is fully described in the following specification and shown in the accompanying drawings, in which:

Fig. 1 is an enlarged longitudinal vertical section through the forward part of the boat;

Fig. 2 is a plan view of the same;

Fig. 3 is an enlarged transverse vertical section through the boat; and

Fig. 4 is an enlarged partial section showing the traveling elevator.

The embodiment illustrated comprises a boat having a metal hull 10 and a bottom 11 forming a water ballast chamber 12. The forward part of the boat is divided into compartments A, B and C which are separated by means of bulk-heads 13 and 14, the compartments B and C serving for the storage of loose materials.

The compartments B and C are preferably divided longitudinally by means of partition members 15 and 16, which also serve to prevent the loose material within the hold from shifting from one side to the other and causing the shift to make a list.

A tunnel 17 as shown in Fig. 5 extends longitudinally throughout the length of compartments B and C and is preferably of sufficient size to permit a man to walk upright therein. A series of openings 18 is provided in this tunnel as shown in Fig. 6, each opening being closed as by means of a sliding door 19 which carries a leg 20 which meshes with a pinion 21 on the shaft 22. By turning this shaft, preferably by means within the tunnel 17, the operator is able to open or close any of the openings 18 at will.

A belt conveyor runs throughout the length of the tunnel 17 and has an upper strand 23 lying beneath the openings 18. This conveyor has suitable head and tail pulleys 24 and 25 respectively as shown in Fig. 3, the pulley 24 being driven by suitable means not shown. This conveyor delivers to an elevator 26 as shown in Fig. 3.

The elevator 26 in turn delivers to a hopper 27 which in turn delivers to the elevator 28 and this to a hopper 29 which in turn delivers to a swinging conveyor 30. This system of conveyors is so well known that it is here shown diagrammatically only and it will be understood that suitable means is provided for driving the conveyors and elevators in the direction indicated by the arrows to keep the material handled by the conveyors and elevators moving continuously out of the boat.

Coal, grain, sand and the like are loaded into the storage compartments of the boat through the hatches 33 as shown in Fig. 5, and in the case of some of these light materials, these compartments are filled susbtantially to the top.

When it is desired to remove this material, the several elevators and conveyors described are started and one of the doors 19 opened sufficiently to permit the material about it in the hold to be fed by gravity to the upper conveyor belt 23 which delivers it to the elevator 26 and thence through the elevator 28 and the conveyor 30 it is carried out of the boat.

As this material passes through the openings 18, it will leave the material in the sides standing at the angle of repose for that particular material as shown by the dotted lines 34 of Fig. 5. One after another of the doors 19 are then opened and the material in the compartment will then assume the general position throughout the length of the compartment represented by the dotted lines 34. The means for removing this material below the lines 34 and at the sides of the tunnel 17, will now be described.

Referring now to Figs. 5 and 6, a longitudinally disposed track 35 is provided at each side of each compartment upon which may roll the wheels 36 of a car 37. At each side of this car 37 is mounted an elevator leg 38 so as to be movable about the axis of the head shaft 39. A chain 40 carrying buckets 41 passes about suitable head and tail sprockets 42 and 43, the former being driven by a suitable means, not shown. A rope 44 is connected to the outer end of the elevator leg and passes over a pulley 45, to a suitable hoisting means, not shown, the purpose of which will later be described.

With the digger which we will call the elevator 38, in the position shown in Fig. 6, in operation, the material in the sides of the tunnel 17 is backed up and dropped into the chute 46 which in turn delivers through the chute 47 to the belt conveyor 23 which carries the material out of the boat as has been previously described.

The car 37 is then advanced toward the pile of the material, as repeatedly as this material is elevated, by a driving mechanism which is not illustrated.

In Fig. 6 the digger 38 has just entered the compartment B through the opening 48 in the bulk-head 13, this opening normally being closed by means of the door 49, hinged to the bulk-head at 50. As shown in Fig. 5, this door is normally secured by means of latches 51 which swing about pivot pins in a well known manner. As the car 37 advances and the chutes 47 approach the opening 48, the chutes which are hinged at 47ª are raised so as to permit them to pass through the opening.

When it is desired to enter a new compartment with the digger, the door 49 is raised by means of the tackle 49ª, the digger 38 being raised by means of the rope 44 so as to pass endwise through the opening 48. The chain 40 is then started and the digger leg 38 lowered into the material which it backs up and carries to the chute 46. The digger is then lowered still further until it assumes the position shown in Fig. 6 when the buckets 41 are barely clearing the bottom 11. In this position the rope 44 is secured and the car 37 advances against the body of the material as has been previously explained.

Thus it will be seen that much of the space at the bottom of the compartment, particularly that at the sides of the tunnel 17 is utilized for the transportation of material, much of this space having previously been wasted since no means was provided for the ready removal of material therefrom. The digger just described not only will do this, but removes the material so thoroughly that very little hand labor for the actual removing of the material is required.

It will be understood that while the invention is described in connection with a boat, it is also applicable to a long bin, or a series of bins which, if desired, may be separated by partitions similar to the bulkheads herein described.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a boat, means for unloading a longitudinal compartment of said boat comprising a central longitudinal tunnel at the bottom of the compartment, a conveyor within said tunnel, doors in said tunnel operable for feeding material in said compartment to said conveyor, and means for feeding to the conveyor the material within said compartment and below the level of the conveyor.

2. In combination, a plurality of adjacent compartments adapted to hold loose material, a tunnel at the lower portion of said compartments having openings communicating therewith, a conveyor within said tunnel for conveying material passing through said openings, doors movable to close said openings, and means movable longitudinally of said tunnel for delivering material at the side of said tunnel to said conveyor.

3. In combination, a plurality of adjacent compartments adapted to hold loose material, a tunnel at the lower portion of said compartments having openings communicating therewith, a conveyor within said tunnel for conveying material passing through said openings, doors movable to close said openings, and an elevator movable longitudinally of said tunnel and having buckets for elevating the material at the sides of said tunnel and for feeding it to said conveyor.

4. In combination, two adjacent compartments adapted to hold loose material, a tunnel at the lower portion of said compartments, a conveyor within said tunnel for conveying material passing through the top of said tunnel, an elevator movable along one side of said tunnel for elevating the loose material at the side of the tunnel, and a chute for carrying said loose material from the elevator to said conveyor.

5. In combination, two adjacent compartments adapted to hold loose material, a tunnel at the lower portion of said compartments, a conveyor within said tunnel for conveying material passing through the top of said tunnel, a track substantially parallel to said tunnel, a car operable on said track, and an elevator carried by said car and adapted to elevate the loose material at the side of said tunnel and to deliver it to said conveyor.

6. In combination, two adjacent compartments adapted to hold loose material, a tunnel at the lower portion of said compartments, a conveyor within said tunnel for conveying material passing through the top of said tunnel, a track substantially parallel to said tunnel, a car operable on said track, an elevator carried by said car and adapted to elevate the loose material at the side of said tunnel and to deliver it to said conveyor, a bulk-head between said compartments, an opening in said bulk-head adapted to permit the passage of said car, and means for raising said elevator to pass through said opening, and a door for closing said opening.

In witness whereof, I have hereunto set my hand and seal this 15th day of December, A. D. 1924.

JACOB R. SENSIBAR.